US012469654B2

(12) United States Patent
Shi et al.

(10) Patent No.: US 12,469,654 B2
(45) Date of Patent: Nov. 11, 2025

(54) OPENING SWITCH AND REMOTE CIRCUIT BREAKER

(71) Applicants: Huawei Digital Power Technologies Co., Ltd., Shenzhen (CN); Shanghai Liangxin Electrical Co., Ltd., Shanghai (CN)

(72) Inventors: Jian Shi, Shanghai (CN); Hao Wang, Shanghai (CN); Shanbo Ren, Shanghai (CN); Xiufeng Zhang, Dongguan (CN); Xiaokang Tian, Shenzhen (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 386 days.

(21) Appl. No.: 18/157,665

(22) Filed: Jan. 20, 2023

(65) Prior Publication Data

US 2023/0154694 A1 May 18, 2023

Related U.S. Application Data

(63) Continuation of application No. PCT/CN2021/100137, filed on Jun. 15, 2021.

(30) Foreign Application Priority Data

Jul. 20, 2020 (CN) ......................... 202010703234.8

(51) Int. Cl.

| | |
|---|---|
| ***H01H 9/02*** | (2006.01) |
| ***H01H 3/38*** | (2006.01) |
| ***H01H 9/20*** | (2006.01) |

(52) U.S. Cl.
CPC ................ *H01H 9/02* (2013.01); *H01H 3/38* (2013.01); *H01H 9/20* (2013.01)

(58) Field of Classification Search
CPC ........... H01H 71/24; H01H 3/02; H01H 3/22; H01H 3/30; H01H 3/38; H01H 3/46;
(Continued)

(56) References Cited

U.S. PATENT DOCUMENTS 4,481,492 A 11/1984 Borne et al.
5,045,657 A * 9/1991 Claar .................... H01H 3/161 200/332

FOREIGN PATENT DOCUMENTS

CN 107045958 A 8/2017
CN 108878224 A 11/2018
CN 110911187 A 3/2020

* cited by examiner

*Primary Examiner* — Anthony R Jimenez
(74) *Attorney, Agent, or Firm* — Leydig, Voit & Mayer, Ltd.

(57) ABSTRACT

An opening switch and a remote circuit breaker are provided. The opening switch includes a base, and an energy storage assembly and a lock catch assembly that are disposed on the base; the energy storage assembly is disposed on an inner wall of the base, one end of the lock catch assembly is hinged to the base, a lock catch protrusion is disposed on the lock catch assembly, and the lock catch protrusion includes a barrier wall; and when the barrier wall is configured to abut against an energy storage arm of the energy storage assembly, under an action force of the energy storage arm, the lock catch assembly has a rotation tendency, so that the energy storage assembly maintains an energy storage state.

15 Claims, 3 Drawing Sheets

(58) Field of Classification Search
CPC .......... H01H 3/3042; H01H 3/04; H01H 9/20; H01H 9/22; H01H 2003/028; H01H 2009/20; H01H 19/02; H01H 19/14; H01H 19/20; H01H 19/24; H01H 19/28
USPC .......................................................... 200/293
See application file for complete search history.

OPENING SWITCH AND REMOTE CIRCUIT BREAKER

CROSS-REFERENCE TO RELATED APPLICATIONS

This application is a continuation of International Application No. PCT/CN2021/100137, filed on Jun. 15, 2021, which claims priority to Chinese Patent Application No. 202010703234.8, filed on Jul. 20, 2020. The disclosures of the aforementioned applications are hereby incorporated by reference in their entireties.

TECHNICAL FIELD

Embodiments of the present application relate to the field of low-voltage electrical switch technologies, and in particular, to an opening switch and a remote circuit breaker.

BACKGROUND

With rapid development of economy, people's living standards are significantly improved, and people have a more comprehensive understanding of safety of using electricity. To improve the safety of using electricity, a switch is usually connected in a circuit. The switch refers to an element that enables a circuit to be opened, enables a current to be interrupted, or enables the current to flow to another circuit. A most common switch is an electromechanical device operated by a person, and has one or more contacts. "Closed" of the contact indicates that the contact is connected and a current is allowed to flow through. "Open" of the switch indicates that the contact is not connected to form an open circuit, and a current is not allowed to flow through. A development history of a switch is from an original knife switch that requires a manual operation to a current intelligent switch that is used in various large electrical control devices. The switch has more functions and higher safety. In a photovoltaic system, a requirement for a remote switching function of a rotary switch gradually occurs. For example, when a fire occurs on a photovoltaic board, remote control is required to disconnect a circuit.

It is difficult to control reliability of a buckle of an existing switch. That is, when no signal is provided, an energy storage module may incorrectly operate due to factors such as vibration, causing opening after the energy storage module releases energy.

SUMMARY

In view of the foregoing disadvantages in the conventional technology, an objective of the present invention is to provide an opening switch and a remote circuit breaker, to resolve a problem that an existing switch buckle causes an energy storage module to incorrectly operate due to factors such as vibration.

To achieve the above objective, a technical solution adopted in embodiments of the present invention is as follows.

According to an aspect of embodiments of the present invention, an opening switch is provided, including a base, and an energy storage assembly and a lock catch assembly that are disposed on the base. One end of the lock catch assembly is hinged to the base, a lock catch protrusion is disposed on the lock catch assembly, and the lock catch protrusion includes a barrier wall. When the barrier wall is configured to abut against an energy storage arm of the energy storage assembly, under an action force of the energy storage arm, the lock catch assembly has a rotation tendency, so that the energy storage assembly maintains an energy storage state.

Optionally, the lock catch protrusion further includes a transition wall. The transition wall and the barrier wall are located on a same side of the lock catch protrusion. When abutting against the energy storage arm of the energy storage assembly, the transition wall is configured to provide a rotation tendency to enable the lock catch assembly to be away from the energy storage arm.

Optionally, an included angle between the transition wall and the barrier wall is an obtuse angle.

Optionally, the transition wall is smoothly connected to the barrier wall.

Optionally, the lock catch protrusion further includes a guide inclined wall. The guide inclined wall is located on a side of the lock catch protrusion opposite to the barrier wall, and the guide inclined wall is configured to guide the energy storage arm to abut against the barrier wall.

Optionally, a first elastic component is further included. One end of the first elastic component is connected to the lock catch assembly, and the other end is connected to the base. The first elastic component is configured to provide a tendency for the lock catch assembly to rotate toward the energy storage arm.

Optionally, the energy storage assembly includes a rotating member that is rotatably connected to the base and a second elastic component that is connected to the rotating member. The energy storage arm is located at one end of the second elastic component. The rotating member is driven to rotate to enable the energy storage arm to abut against the barrier wall, so that the second elastic component is compressed, and the energy storage assembly is in the energy storage state.

Optionally, the rotating member includes a rotating shaft that is rotatably connected to the base, and a turntable that is disposed on the rotating shaft. The second elastic component is a torsion spring, one end of the torsion spring abuts against the base, and the other end of the torsion spring abuts against the turntable. The other end of the torsion spring is the energy storage arm of the energy storage assembly.

According to another aspect of embodiments of the present invention, a remote circuit breaker is provided, including any opening switch mentioned above.

Optionally, the remote circuit breaker further includes a release. The release is disposed corresponding to the other end of the lock catch assembly in the opening switch. The release drives the lock catch assembly to rotate along a hinged part, so that the energy storage arm in the opening switch is separated from the barrier wall.

Beneficial effects of the present invention include:

The present invention provides the opening switch, and the energy storage assembly and the lock catch assembly are disposed on the base of the opening switch. The energy storage assembly is disposed on the base, and one end of the lock catch assembly is hinged to the base. That is, the lock catch assembly can rotate by using an end thereof hinged with the base. The lock catch protrusion is disposed on the lock catch assembly, and the lock catch protrusion includes the barrier wall disposed on a side of the lock catch protrusion. When the barrier wall on the lock catch protrusion abuts against the energy storage arm in the energy storage assembly (that is, the lock catch assembly locks the energy storage assembly), the energy storage assembly is in the energy storage state. In this case, the energy storage arm applies an action force to the barrier wall under an action of recovery of the energy storage assembly itself (that is, the energy storage assembly itself has a tendency to switch from the energy storage state to an energy release state). A magnitude of the action force may be properly set based on an actual situation. Because one end of the lock catch assembly is hinged to the base, when the action force acts on the lock catch assembly (the lock catch protrusion), the lock catch assembly is enabled to have a tendency to rotate along the hinged end (that is, the lock catch assembly has a moment under the action force). In addition, a direction of the rotation tendency is a direction enabling the lock catch assembly as a whole (including the lock catch protrusion) to be close to the energy storage arm, thereby promoting abutment between the lock catch protrusion and the energy storage arm of the energy storage assembly, so that limiting between the energy storage assembly and the lock catch assembly is strengthened.

The present invention further provides the remote circuit breaker. The opening switch is applied to the remote circuit breaker, so that stability and an anti-interference capability of the entire remote circuit breaker during use can be effectively improved by using the barrier wall on the lock catch assembly in the opening switch.

BRIEF DESCRIPTION OF DRAWINGS

To describe the technical solutions in embodiments of the present invention more clearly, the following briefly describes the accompanying drawings required for describing embodiments. It should be understood that, the following accompanying drawings show merely some embodiments of the present invention, and therefore should not be construed as a limitation on the scope. A person of ordinary skill in the art may still derive other related drawings from these accompanying drawings without creative efforts.

Figure 1:
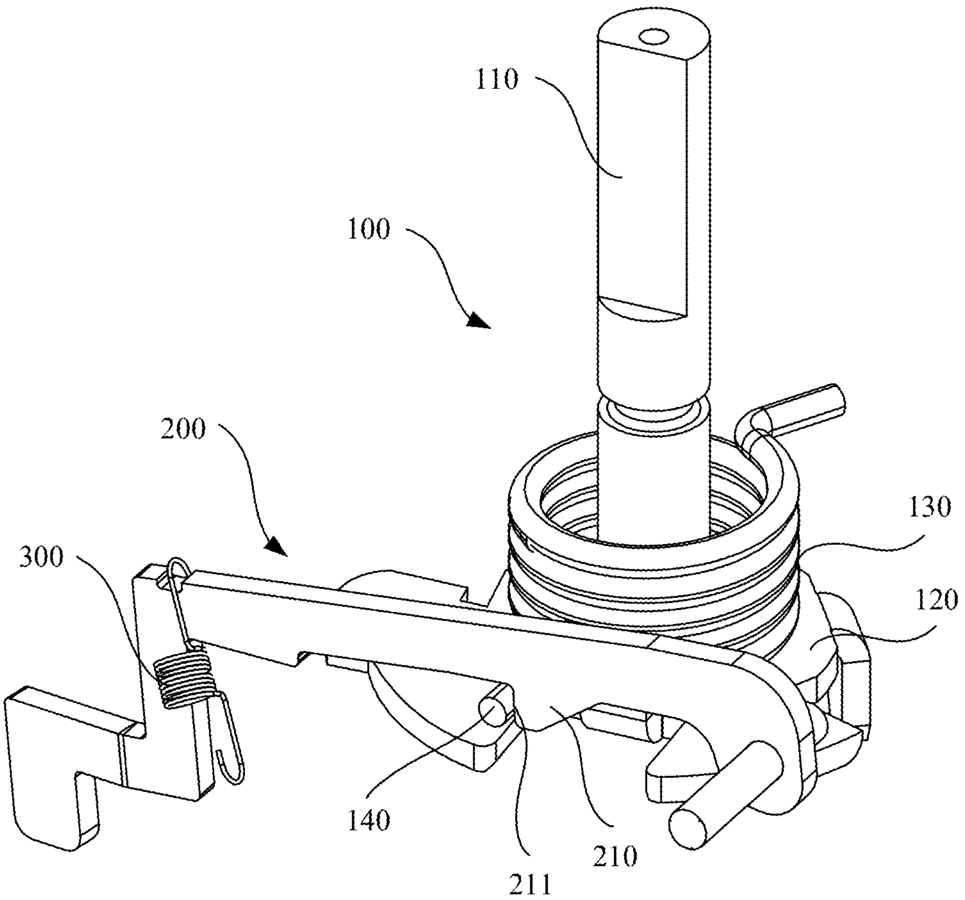
FIG. 1 is a first schematic diagram of a structure of an opening switch according to an embodiment of the present invention.

Reference numerals: 100—energy storage assembly; 110—rotating shaft; 120—turntable; 130—second elastic component; 140—energy storage arm; 200—lock catch assembly; 210—lock catch protrusion; 211—barrier wall; 212—transition wall; 213—guide inclined wall; and 300—first elastic component.

DESCRIPTION OF EMBODIMENTS

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. Generally, components of embodiments of the present invention described and shown in the accompanying drawings may be arranged and designed in various manners.

Therefore, the following detailed description of embodiments of the present invention in the accompanying drawings is not intended to limit the protection scope of the present invention, but merely represent selected embodiments of the present invention. It should be noted that, in a case of no conflict, features in embodiments of the present invention may be combined with each other, and combined embodiments still fall within the protection scope of the present invention.

It should be noted that similar reference signs and letters represent similar items in the accompanying drawings below. Therefore, once an item is defined in one drawing, it does not need to be further defined and described in subsequent drawings.

In the description of the present invention, it should be noted that the terms such as "up", "down", "left", "right", "vertical", and "outside" are merely used to describe the present invention and simplify the description, and therefore cannot be construed as a limitation on the present invention. In addition, the terms such as "first", "second", and "third" are used only for distinguishing descriptions and cannot be understood to indicate or imply relative importance.

In the description of the present invention, it should be noted that, unless otherwise specified and defined explicitly, the terms "dispose", "mount", "connected", and "connect" should be understood broadly, for example, may be a fixed connection, a detachable connection, or an integral connection, may be a mechanical connection or an electrical connection, may be a direct connection or an indirect connection implemented by using an intermediate medium, or may be an internal connection between two components. A person of ordinary skill in the art may understand specific meanings of the foregoing terms in the present invention based on a specific situation.

With popularization of electric equipment, comprehensive coverage of a power grid has a higher requirement for safety of using electricity. To reduce losses in a process of transmitting electricity, a high voltage or an ultra-high voltage is usually used in a power grid to transmit electricity, and the electricity is connected to a home of a user after the voltage is reduced by using a substation. However, to ensure safety of using electricity by the user, devices such as a switch and a circuit breaker are usually disposed in the home of the user, to control on/off of a circuit. An action of controlling the switch is essentially controlling an energy storage part in the switch to release energy or store energy. When the switch is in a normal state, the energy storage part is in an energy release state, that is, the energy storage part is not locked. In this case, the switch is usually in a turn-off state. When an external force is applied to drive the energy storage part to an energy storage location, the energy storage part usually needs to be locked in the energy storage location, for example, the energy storage part is kept in an energy storage state by using a buckle. In this case, the switch is usually in a turn-on state. When the circuit needs to be disconnected, the energy storage part may be enabled to release energy to drive the switch from the turn-on state to the turn-off state. Due to complexity of a switch disposing environment, when the energy storage part is locked by a buckle of an existing switch, the energy storage part may incorrectly operate due to factors such as vibration. Consequently, after the energy storage part releases the energy, the switch is turned off, resulting in disconnection of the circuit, and affecting normal production and life. Based on this, this application proposes an opening switch and a remote circuit breaker, to resolve or improve the foregoing existing problems.

According to an aspect of embodiments of the present invention, an opening switch is provided, including a base, and an energy storage assembly 100 and a lock catch assembly 200 that are disposed on the base. One end of the lock catch assembly 200 is hinged to the base, a lock catch protrusion 210 is disposed on the lock catch assembly 200, and the lock catch protrusion 210 includes a barrier wall 211. When the barrier wall 211 is configured to abut against an energy storage arm 140 of the energy storage assembly 100, under an action force of the energy storage arm 140, the lock catch assembly 200 has a rotation tendency, so that the energy storage assembly 100 maintains an energy storage state.

For example, as shown in FIG. 1, the energy storage assembly 100 and the lock catch assembly 200 are disposed on the base of the opening switch. The energy storage assembly 100 is disposed on the base, and one end of the lock catch assembly 200 is hinged to the base. That is, the lock catch assembly 200 can rotate by using an end thereof hinged with the base. The lock catch protrusion 210 is formed on the lock catch assembly 200, that is, the lock catch protrusion 210 is a part of the lock catch assembly 200. The lock catch protrusion 210 includes the barrier wall 211 disposed on a side of the lock catch protrusion 210. When the barrier wall 211 on the lock catch protrusion 210 abuts against the energy storage arm 140 in the energy storage assembly 100 (that is, the lock catch assembly 200 locks the energy storage assembly 100), the energy storage assembly 100 is in the energy storage state. In this case, the energy storage arm 140 applies an action force to the barrier wall 211 under an action of recovery of the energy storage assembly 100 itself (that is, the energy storage assembly 100 itself has a tendency to switch from the energy storage state to an energy release state). A magnitude of the action force may be properly set based on an actual situation. This is not specifically limited in this embodiment. Because one end of the lock catch assembly 200 is hinged to the base, when the action force acts on the lock catch assembly 200 (the lock catch protrusion 210), the lock catch assembly 200 is enabled to have a tendency to rotate along the hinged end (that is, the lock catch assembly 200 has a moment under the action force). In addition, a direction of the rotation tendency is toward a direction close to the energy storage arm 140, that is, the entire lock catch assembly 200 (including the lock catch protrusion) has a tendency to be close to the energy storage arm 140, thereby promoting abutment between the lock catch protrusion 210 and the energy storage arm 140 of the energy storage assembly 100, so that limiting between the energy storage assembly 100 and the lock catch assembly 200 is strengthened.

When the entire opening switch is vibrated at an amplitude, a moment applied by the energy storage arm 140 of the energy storage assembly 100 to the lock catch assembly 200 counteracts an opposite moment (namely, a moment that is opposite to a direction of a moment applied by the energy storage arm 140 to the lock catch assembly 200 to promote limiting) generated by vibration. Therefore, that the energy storage arm 140 of the energy storage assembly 100 is separated from the barrier wall 211 of the lock catch protrusion 210 of the lock catch assembly 200 due to a degree of vibration of the opening switch, and the energy storage assembly 100 releases energy to drive the switch to switch an opening state and a closing state is avoided. This improves stability of the opening switch when being used and avoids damage to an electrical device due to accidental opening. It should be noted that, as shown in FIG. 1, the lock catch protrusion 210 is a table-shaped protrusion formed on the lock catch assembly 200. When the energy storage arm 140 acts on the barrier wall 211 of the table-shaped protrusion, the entire lock catch assembly 200 has a tendency to rotate close to the energy storage arm 140. When the lock catch protrusion 210 is a hook-shaped protrusion formed on the lock catch assembly 200, the barrier wall 211 may be disposed away from a connection between the hook-shaped protrusion and the lock catch assembly 200. In this case, when the energy storage arm 140 acts on the barrier wall 211 of the hook-shaped protrusion, the entire lock catch assembly 200 still has a tendency to rotate close to the energy storage arm 140.

Figure 2:
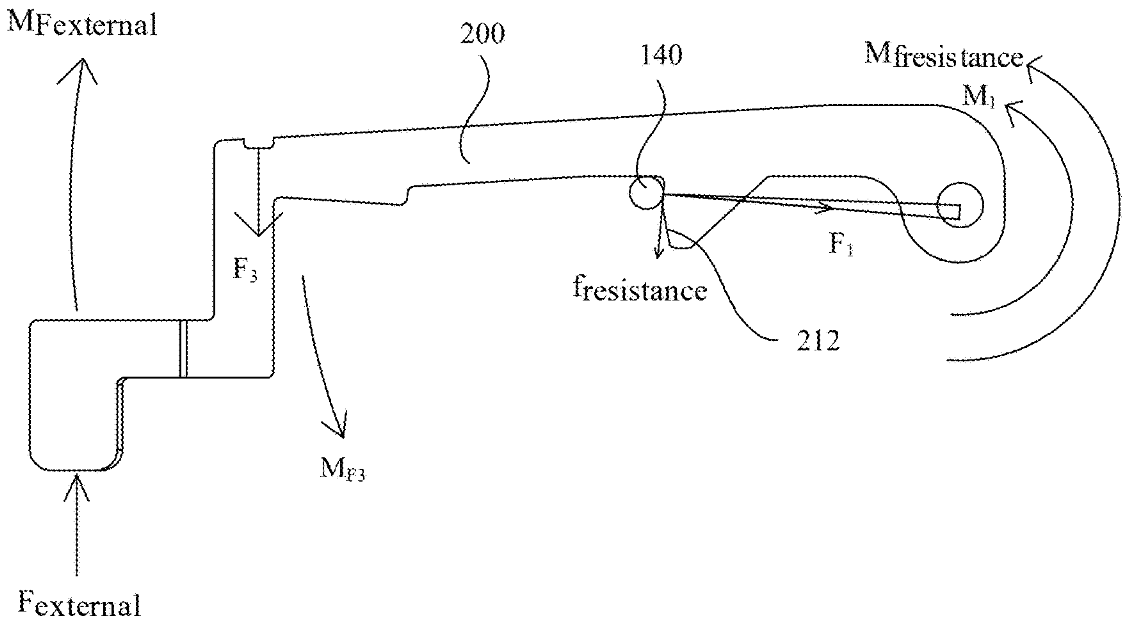
FIG. 2 is a first schematic diagram of a force on a lock catch assembly in an opening switch according to an embodiment of the present invention.

When the barrier wall 211 of the lock catch protrusion 210 abuts against the energy storage arm 140 of the energy storage assembly 100, the action force applied by the energy storage arm 140 to the barrier wall 211 enables a rotation moment generated by the lock catch assembly 200 to make the lock catch assembly 200 and the energy storage arm 140 have a tendency to approach each other. As shown in FIG. 1 and FIG. 2, when the lock catch assembly 200 is a rod assembly, one end of the lock catch assembly 200 is hinged to the base. In addition, the lock catch protrusion 210 is disposed below the lock catch assembly 200, and the barrier wall 211 is disposed on a side of the lock catch protrusion 210 away from the hinged end. The barrier wall 211 has an angle of inclination. The angle of inclination may be properly set based on a location of the hinged end of the lock catch assembly 200. As shown in FIG. 2, when the energy storage arm 140 abuts against the barrier wall 211 with the angle of inclination, the energy storage arm 140 applies an action force $F_1$ the barrier wall 211 at an abutment location, and an extending direction of the action force $F_1$ needs to be located below a line connecting the abutment location and a hinge location (as shown in FIG. 2). In this case, the action force $F_1$ generates a counterclockwise moment $M_1$ on the lock catch assembly 200, so that the lock catch assembly 200 generates a counterclockwise rotation tendency, thereby strengthening limiting of the barrier wall 211 and the energy storage arm 140, and implementing more stable locking. Therefore, the energy storage assembly 100 can still stably maintain the energy storage state under a specific amplitude of vibration.

Optionally, the lock catch protrusion 210 further includes a transition wall 212. The transition wall 212 and the barrier wall 211 are located on a same side of the lock catch protrusion 210. When abutting against the energy storage arm 140 of the energy storage assembly 100, the transition wall 212 is configured to provide a rotation tendency to enable the lock catch assembly 200 to be away from the energy storage arm 140.

Figure 3:
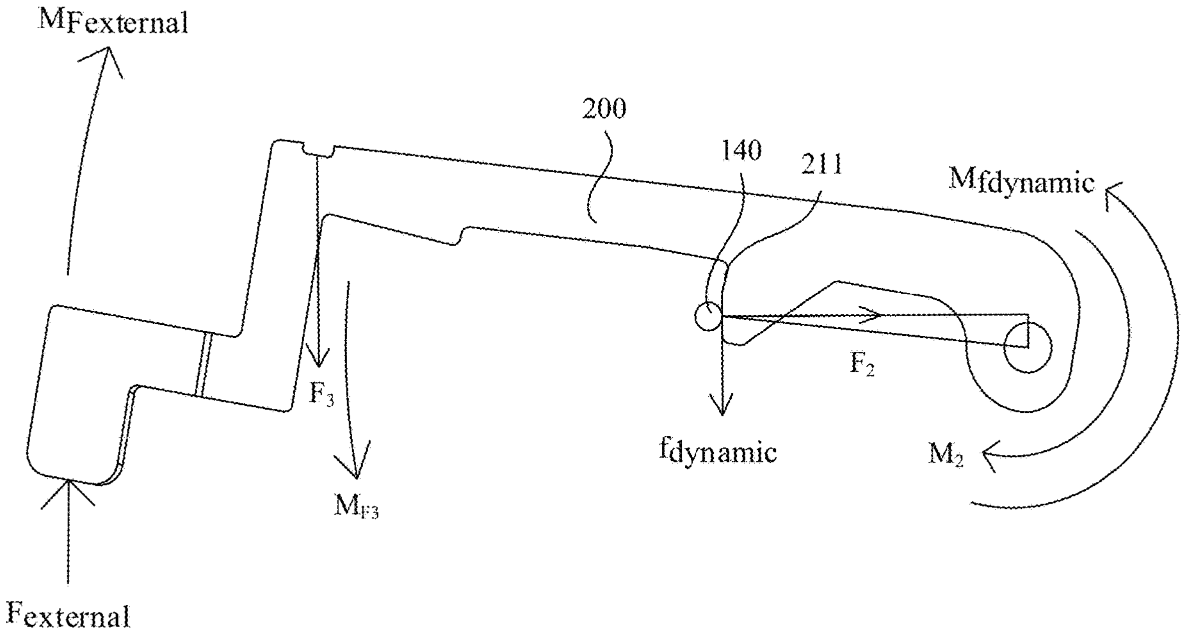
FIG. 3 is a second schematic diagram of a force on a lock catch assembly in an opening switch according to an embodiment of the present invention.

For example, the lock catch protrusion 210 may further include the transition wall 212. The transition wall 212 needs to be disposed on a same side as the barrier wall 211. For example, as shown in FIG. 3, the transition wall 212 is located on a side of the lock catch protrusion 210 away from the hinged end. When the energy storage arm 140 needs to be separated from the lock catch protrusion 210 to implement energy release of the energy storage assembly 100, an external force may be applied to the other end of the lock catch assembly 200, thereby driving the lock catch assembly 200 to rotate in a direction away from the energy storage arm 140. For example, as shown in FIG. 3, the lock catch assembly 200 rotates clockwise under an external force (which may be provided by a release). In this case, the energy storage arm 140 gradually switches from the energy storage state to the energy release state. In a switching process, the energy storage arm 140 slides (moves relative to each other) from a wall surface that abuts against the barrier wall 211 to a wall surface of the transition wall 212 below the barrier wall 211. In this case, because the energy storage arm 140 still stores energy, the energy storage arm 140 further applies an action force to the transition wall 212. Because one end of the lock catch assembly 200 is hinged to the base, when the action force acts on the lock catch assembly 200 (the lock catch protrusion 210), the lock catch assembly 200 is enabled to generate a tendency to rotate along the hinged end. In addition, the rotation tendency is to rotate in a direction away from the energy storage arm 140, to promote separation between the lock catch protrusion 210 and the energy storage arm 140, so that the energy storage assembly 100 can release energy smoothly. In particular, the lock catch assembly 200 is rotated by applying an external force to the lock catch assembly 200 by using the release, so that the lock catch protrusion 210 is separated from the energy storage arm 140, and the energy storage assembly 100 can release energy. A reason is that, due to a structural limitation of the release itself, a striking force of a protruding end of the release gradually weakens as a distance extending outward increases. The disposed transition wall 212 can effectively avoid a case in which complete separation between the energy storage arm 140 and the lock catch protrusion 210 cannot be implemented due to a decrease in a later striking force of the release, and then the energy storage assembly 100 cannot release energy when disconnection is needed. This effectively ensures that the energy storage assembly 100 can smoothly and accurately release energy when the energy storage assembly 100 needs to release energy, and further improves control accuracy of the opening switch in this application.

When the transition wall 212 of the lock catch protrusion 210 abuts against the energy storage arm 140 of the energy storage assembly 100, the action force applied by the energy storage arm 140 to the transition wall 212 enables a rotation moment generated by the lock catch assembly 200 to make the lock catch assembly 200 and the energy storage arm 140 have a tendency to be away from each other. As shown in FIG. 3, when the lock catch assembly 200 is a rod assembly, one end of the lock catch assembly 200 is hinged to the base. In addition, the lock catch protrusion 210 is disposed below the lock catch assembly 200, and the barrier wall 211 and the transition wall 212 are disposed on the side of the lock catch protrusion 210 away from the hinged end. The transition wall 212 is located below the barrier wall 211, and the transition wall 212 has an angle of inclination (the angle of inclination of the transition wall 212 may be the same as or different from the angle of inclination of the barrier wall 211 in the foregoing embodiment). The angle of inclination may be properly set based on the location of the hinged end of the lock catch assembly 200. As shown in FIG. 3, when the energy storage arm 140 abuts against the transition wall 212 with the angle of inclination, the energy storage arm 140 applies an action force $F_2$ to the barrier wall 211 at an abutment location, and an extending direction of the action force $F_2$ needs to be located above a line connecting the abutment location and a hinge location (as shown in FIG. 3). In this case, the action force $F_2$ generates a clockwise moment $M_2$ on the lock catch assembly 200, so that the lock catch assembly 200 generates a clockwise rotation tendency, thereby prompting separation between the lock catch protrusion 210 and the energy storage arm 140. Therefore, the energy storage assembly 100 can still smoothly release energy when the striking force is small. When $M_{F\ external} > M_{f\ resistance} + M_1 + M_{F3}$, in this case, it can be ensured that the lock catch assembly 200 rotates, under the action of the external force, along the hinged end to drive the barrier wall 211 to move relative to the energy storage arm 140, so that the energy storage arm 140 can slide to the transition wall 212. When $M_{F\ external} + M_2 > M_{f\ dynamic} + M_{F3}$, and other friction forces of a system can be overcome, the lock catch assembly 200 continues to move to an unlock (energy release) location. $M_{F\ external}$ refers to an external force applied to the other end of the lock catch assembly 200 relative to the hinged end, and may be the striking force of the release. When the energy storage arm 140 abuts against the barrier wall 211, a friction force is $f_{resistance}$, the friction force is a dynamic friction force when the energy storage arm 140 and the barrier wall 211 move relative to each other, and is a static friction force when the energy storage arm 140 and the barrier wall 211 are relatively stationary and have a tendency to move relative to each other. A moment generated corresponding to the friction force is $M_{f\ resistance}$. $M_{f\ dynamic}$ is a moment generated by a dynamic friction force $f_{dynamic}$ when the energy storage arm 140 slides on the transition wall 212. $M_{F3}$ is a moment of an action force $F_3$ applied by a first elastic component 300 to the lock catch assembly 200. If a value of $M_2$ is set to $M_2 > M_{f\ dynamic} + M_{F3}$, it is only necessary to ensure that a releasing apparatus can drive the energy storage arm 140 to slide onto the transition wall 212, and then reliable releasing can be ensured. That is, as long as the striking force $F_{external}$ provided by the release can drive the lock catch assembly 200 to enable the energy storage arm 140 to contact with the transition wall 212, reliable releasing can be ensured.

Figure 4:
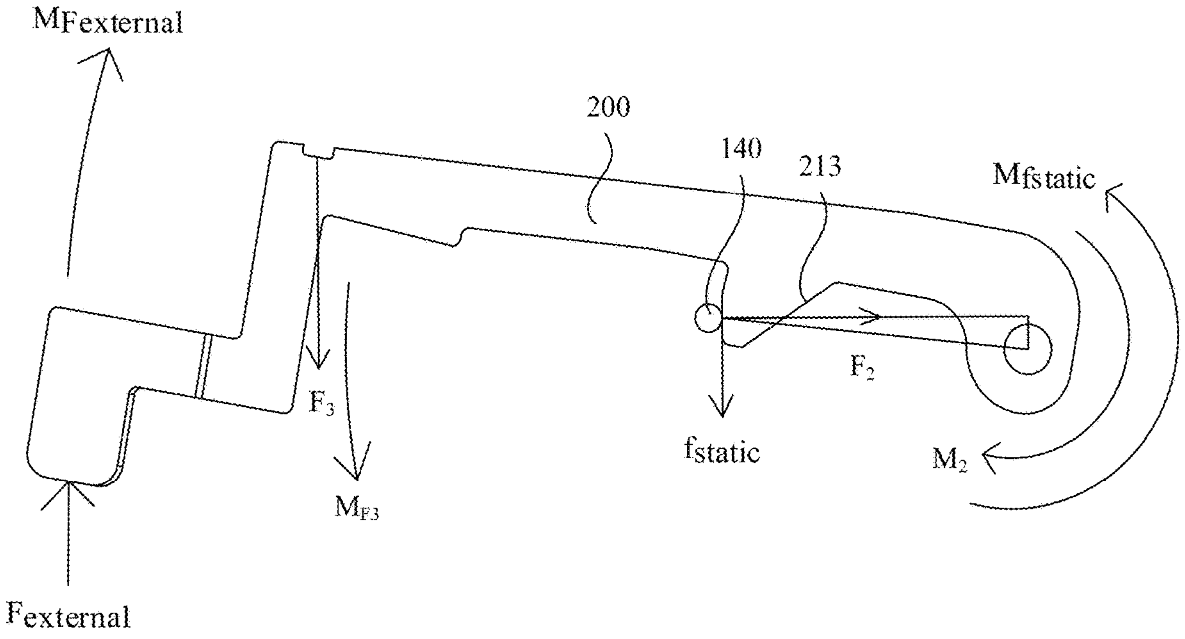
FIG. 4 is a third schematic diagram of a force on a lock catch assembly in an opening switch according to an embodiment of the present invention.

In addition, as shown in FIG. 4, when the opening switch is subjected to external vibration, the lock catch protrusion 210 gradually moves slowly from a locked location (the energy storage state of the energy storage assembly 100) to a releasing location (the energy release state of the energy storage assembly 100) under an external vibration force. When the transition wall 212 abuts against the energy storage arm 140 of the energy storage assembly 100, a friction force generated on the lock catch protrusion 210 is $f_{static}$(where $f_{static} = \mu_{static} \times F_2$, $\mu_{static}$ is a static friction factor on the transition wall 212; $f_{dynamic} = \mu_{dynamic} \times F_2$, $\mu_{dynamic}$ is a dynamic friction factor on the transition wall 212; $F_2$ is the action force applied to the transition wall 212 by the energy storage arm 140 of the energy storage assembly 100; and because $\mu_{static}$ is much greater than $\mu_{dynamic}$, $f_{static}$ is much greater than $f_{dynamic}$), and a generated moment is $M_{f\ static}$. When $M_2 < M_{f\ static}$, it can still be ensured that the energy storage assembly 100 maintains the energy storage state. When the first elastic component 300 in the following embodiment is included, when $M_2 < M_{f\ static} + M_{F3}$, it can still be ensured that the energy storage assembly 100 maintains the energy storage state. Therefore, the transition wall 212 is disposed, so that an anti-interference capability of the opening switch in this application can be further improved, that is, an upper limit of a misoperation of the opening switch due to vibration is further increased.

Optionally, an included angle between the transition wall 212 and the barrier wall 211 is an obtuse angle.

For example, the included angle between the transition wall 212 and the barrier wall 211 is an obtuse angle. As shown in FIG. 4, this can effectively ensure roles of the transition wall 212 and the barrier wall 211. This avoids that when respective angles of inclination of the transition wall 212 and the barrier wall 211 are large, for example, less than 90 degrees, the barrier wall 211 has a strong action force in promoting limiting, and the strong action force increases a difficulty in releasing energy by the energy storage assembly 100.

Optionally, the included angles between the transition wall 212 and the barrier wall 211 are 150° to 178°.

Further, the included angles between the transition wall 212 and the barrier wall 211 are 165° to 175°.

It should be noted that, the included angle between the transition wall 212 and the barrier wall 211 needs to be a smaller included angle between two wall surfaces. For example, in FIG. 4, there are two included angles between the transition wall 212 and the barrier wall 211, a first included angle is a reflex angle, and a second included angle is an obtuse angle. An included angle formed between two wall surfaces that form the obtuse angle is the included angle between the transition wall 212 and the barrier wall 211 described in this application.

Optionally, the transition wall 212 is smoothly connected to the barrier wall 211.

For example, the transition wall 212 and the barrier wall 211 are connected to each other in a smooth manner. That is, a connection between the transition wall 212 and the barrier wall 211 is a smooth transition, for example, may be an arc transition. Smoothness of movement of the energy storage assembly 100 during energy storage or energy release may be effectively improved. In addition, wear between the energy storage assembly 100 and the lock catch assembly 200 is also reduced, thereby prolonging a service life of the opening switch in this application.

Optionally, the lock catch protrusion 210 further includes a guide inclined wall 213. The guide inclined wall 213 is located on a side of the lock catch protrusion 210 opposite to the barrier wall 211, and the guide inclined wall 213 is configured to guide the energy storage arm 140 to abut against the barrier wall 211.

For example, to further improve smoothness of the energy storage assembly 100 when switching from the energy release state to the energy storage state, as shown in FIG. 4, the guide inclined wall 213 may be further disposed. The guide inclined wall 213 is located on a side of the lock catch protrusion 210 close to the hinged end, that is, the guide inclined wall 213 is located on the other side of the lock catch protrusion 210, and is disposed opposite to the side of the barrier wall 211 and the transition wall 212. A larger angle of inclination of the guide inclined wall 213 indicates better smoothness of the energy storage assembly 100 when switching from the energy release state to the energy storage state. However, lengths of the barrier wall 211 and the transition wall 212 disposed on the opposite side need to be properly considered during setting, so that proper setting is performed.

Optionally, the first elastic component 300 is further included. One end of the first elastic component 300 is connected to the lock catch assembly 200, and the other end is connected to the base. The first elastic component 300 is configured to provide a tendency for the lock catch assembly 200 to rotate toward the energy storage arm 140.

For example, to further improve limiting capabilities of the lock catch assembly 200 and the energy storage assembly 100, as shown in FIG. 1 and FIG. 2, the first elastic component 300 may be disposed on the lock catch assembly 200, one end of the first elastic component 300 is connected to the lock catch assembly 200, and the other end may be connected to the base. A location at which the first elastic component 300 is disposed on the lock catch assembly 200 needs to be away from the hinged end of the lock catch assembly 200, so that the first elastic component 300 can always be in a stretched state, to provide a moment for the lock catch assembly 200 to approach the energy storage arm 140. As shown in FIG. 1, the first elastic component 300 is a tension spring, and one end of the first elastic component 300 is connected to the other end (which is opposite to the hinged end of the lock catch assembly 200) of the lock catch assembly 200, and the other end is connected to the base. By keeping the first elastic component 300 in the stretched state, the action force $F_3$ is provided for the lock catch assembly 200, and the action force $F_3$ generates a counterclockwise moment $M_{F3}$ on the lock catch assembly 200.

Optionally, the energy storage assembly 100 includes a rotating member that is rotatably connected to the base and a second elastic component 130 that is rotatably connected to the rotating member. The energy storage arm 140 is located at one end of the second elastic component 130. The rotating member is driven to rotate to enable the energy storage arm 140 to abut against the barrier wall 211, so that the second elastic component 130 is compressed, and the energy storage assembly 100 is in the energy storage state.

Optionally, the rotating member includes a rotating shaft 110 that is rotatably connected to the base, and a turntable 120 that is disposed on the rotating shaft 110. The second elastic component 130 is a torsion spring, one end of the torsion spring abuts against the base, and the other end abuts against the turntable 120. The other end of the torsion spring is the energy storage arm 140 of the energy storage assembly 100.

For example, as shown in FIG. 1, the energy storage assembly 100 may further include the rotating member that is rotatably connected to the base and the second elastic component 130. One end of the second elastic component 130 may be the energy storage arm 140 of the energy storage assembly 100 in the foregoing embodiment, and the other end of the second elastic component 130 may be disposed on the base. When the energy storage assembly 100 is in the energy release state, the rotating member is driven (this driving force may be applied by a machine or an operator, and this is not limited in this application) to rotate, to drive the energy storage arm 140 on the second elastic component 130 to move in a direction close to the lock catch protrusion 210. Finally, the energy storage arm 140 on the second elastic component 130 is enabled to slide onto the barrier wall 211 on the lock catch protrusion 210, to complete locking relative limiting of the energy storage assembly 100 and the lock catch assembly 200, thereby implementing energy storage of the energy storage assembly 100 (when being driven under an external force to rotate, the second elastic component 130 is compressed, thereby implementing gradual energy storage). By compressing of the second elastic component 130 to store energy, energy storage of the entire energy storage assembly 100 is implemented, so that an entire energy storage structure is simple. In addition, the rotating member is rotatably connected to the base, that is, energy storage is implemented in a rotating manner, to facilitate overall miniaturization of the opening switch.

Figure 5:
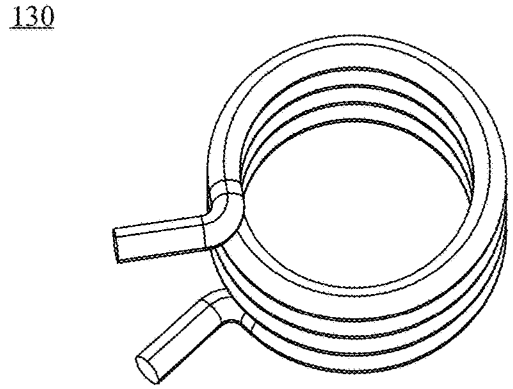
FIG. 5 is a schematic diagram of a structure of a second elastic component in an opening switch according to an embodiment of the present invention.

For example, as shown in FIG. 1 and FIG. 5, when the second elastic component 130 is the torsion spring, and the rotating member is in a structure in which the rotating shaft 110 cooperates with the turntable 120, the rotating shaft 110 is rotatably connected to the base. In addition, the turntable 120 is fixedly (including a removable connection) disposed on the rotating shaft 110, one end of the torsion spring abuts against the base, and the other end (namely, the energy storage arm 140) abuts against a protrusion on the turntable 120. The turntable 120 is driven to rotate by rotating the rotating shaft 110 (for convenience of operation, a handle may be further provided at an end of the rotating shaft 110). Then, by using the protrusion on the turntable 120, the other end of the torsion spring is driven to rotate toward the end that abuts against the base, thereby storing elastic potential energy of the torsion spring during a rotation process. The energy storage arm 140 of the torsion spring moves along the guide inclined wall 213 on the lock catch assembly 200 toward the barrier wall 211 on the other side. In this case, the lock catch assembly 200 rotates clockwise at a small angle, and the corresponding energy storage arm 140 also deforms slightly downward. When the energy storage arm 140 moves from the transition wall 212 to the barrier wall 211, the lock catch assembly 200 generates a counterclockwise rotation tendency under actions of the first elastic component 300 and the energy storage arm 140, so that the energy storage arm 140 and the barrier wall 211 perform stable limit locking, to implement energy storage of the energy storage assembly 100. When energy release needs to be performed, an external force may be applied to the other end (that is opposite to the hinged end) of the lock catch assembly 200, and the lock catch assembly 200 is driven to rotate clockwise by using the external force. In this case, according to a theory of relativity, when the energy storage arm 140 slides along the barrier wall 211 of the lock catch protrusion 210 from the transition wall 212 to the guide inclined wall 213, energy release of the torsion spring is completed.

According to another aspect of embodiments of the present invention, a remote circuit breaker is provided, including any opening switch mentioned above.

For example, the opening switch is applied to the remote circuit breaker, so that stability and an anti-interference capability of the entire remote circuit breaker during use can be effectively improved by using the barrier wall 211 on the lock catch assembly 200 in the opening switch.

Optionally, the remote circuit breaker further includes a release. The release is disposed corresponding to the other end of the lock catch assembly 200 in the opening switch. The release drives the lock catch assembly 200 to rotate along a hinged part, so that the energy storage arm 140 in the opening switch is separated from the barrier wall 211.

For example, a signal terminal and the release that is electrically connected to the signal terminal are disposed in the opening switch, so that a control instruction is remotely sent to the signal terminal, and an action of the release is controlled by using the signal terminal, thereby finally implementing energy release control on the energy storage assembly 100 in the opening switch. A protruding end of the release is correspondingly disposed on the other end of the lock catch assembly 200 opposite to the hinged end (in comparison with a rod body disposed on the lock catch assembly 200, this can reduce a requirement for a striking force during tripping). Therefore, the energy storage arm 140 can be separated from the barrier wall 211 of the lock catch protrusion 210 by applying a small striking force MF external to the lock catch assembly 200, thereby implementing remote tripping. This effectively expands a scope and scenario of use. For example, as shown in FIG. 2, when the energy storage arm 140 abuts against the barrier wall 211, a friction force is $f_{resistance}$ (where $f_{resistance}=\mu_{resistance}\times F_1$, and $\mu_{resistance}$ is a dynamic friction factor on the barrier wall 211), and a moment generated by the friction force is $M_{f\ resistance}$. When the lock catch assembly 200 is subjected to a striking force $F_{external}$ of a releasing apparatus, a moment $M_{f\ resistance}$ is generated. When $M_{F\ external}>M_1+M_{f\ resistance}+M_{F3}$, and other frictions of a system can be overcome, the lock catch assembly 200 can move from a locked location to an unlocked location. The release may be one or a combination of a magnetic flux converter, a separate release, an undervoltage release, or an overvoltage release. A manner of driving the lock catch assembly 200 by the release may be extended driving, retracted driving, or the like. During selecting, a person skilled in the art can make a reasonable selection based on an actual requirement. This is not limited in this application.

The foregoing is merely illustrative of the preferred embodiments of the present invention and is not intended to limit the present invention, and various changes and modifications can be made by a person skilled in the art. Any modification, equivalent replacement, or improvement made without departing from the spirit and principle of the present invention shall fall within the protection scope of the present invention.

What is claimed is:

1. An opening switch comprising:

a base;

an energy storage assembly; and a lock catch assembly disposed on the base;

wherein one end of the lock catch assembly is hinged to the base, a lock catch protrusion is disposed on the lock catch assembly, and the lock catch protrusion comprises a barrier wall;

wherein based on the barrier wall being configured to abut against an energy storage arm of the energy storage assembly, under an action force of the energy storage arm, the lock catch assembly has a rotation tendency, so that the energy storage assembly maintains an energy storage state, wherein the lock catch protrusion further comprises a transition wall, wherein the transition wall and the barrier wall are located on a same side of the lock catch protrusion, and upon abutting against the energy storage arm of the energy storage assembly, the transition wall is configured to provide the rotation tendency to enable the lock catch assembly to be away from the energy storage arm.

2. The opening switch according to claim 1, wherein an included angle between the transition wall and the barrier wall is an obtuse angle.

3. The opening switch according to claim 1, wherein the transition wall is connected to the barrier wall with an arc transition.

4. The opening switch according to claim 1, wherein the lock catch protrusion further comprises a guide inclined wall, wherein the guide inclined wall is located on a side of the lock catch protrusion opposite to the barrier wall, and is configured to guide the energy storage arm to abut against the barrier wall.

5. The opening switch according to claim 1, further comprising: a first elastic component, wherein one end of the first elastic component is connected to the lock catch assembly, an other end is connected to the base, and the first elastic component is configured to provide a tendency for the lock catch assembly to rotate toward the energy storage arm.

6. The opening switch according to claim 1, wherein the energy storage assembly comprises a rotating member that is rotatably connected to the base and a second elastic component that is connected to the rotating member; and wherein the energy storage arm is located at one end of the second elastic component; and the rotating member is driven to rotate to enable the energy storage arm to abut against the barrier wall, so that the second elastic component is compressed, and the energy storage assembly is in the energy storage state.

7. The opening switch according to claim 6, wherein the rotating member comprises a rotating shaft that is rotatably connected to the base, and a turntable that is disposed on the rotating shaft; the second elastic component is a torsion spring, one end of the torsion spring abuts against the base, and an other end of the torsion spring abuts against the turntable; and the other end of the torsion spring is the energy storage arm of the energy storage assembly.

8. A remote circuit breaker comprising an opening switch including:

a base;

an energy storage assembly; and a lock catch assembly disposed on the base;

wherein one end of the lock catch assembly is hinged to the base, a lock catch protrusion is disposed on the lock catch assembly, and the lock catch protrusion comprises a barrier wall;

wherein based on the barrier wall being configured to abut against an energy storage arm of the energy storage assembly, under an action force of the energy storage arm, the lock catch assembly has a rotation tendency, so that the energy storage assembly maintains an energy storage state, wherein the lock catch protrusion further comprises a transition wall, wherein the transition wall and the barrier wall are located on a same side of the lock catch protrusion, and upon abutting against the energy storage arm of the energy storage assembly, the transition wall is configured to provide the rotation tendency to enable the lock catch assembly to be away from the energy storage arm.

9. The remote circuit breaker according to claim 8, further comprising: a release, wherein the release is disposed corresponding to an other end of the lock catch assembly in the opening switch; and the release drives the lock catch assembly to rotate along a hinged part, so that the energy storage arm in the opening switch is separated from the barrier wall.

10. The remote circuit breaker according to claim 8, wherein an included angle between the transition wall and the barrier wall is an obtuse angle.

11. The remote circuit breaker according to claim 8, wherein the transition wall is connected to the barrier wall with an arc transition.

12. The remote circuit breaker according to claim 8, wherein the lock catch protrusion further comprises a guide inclined wall, wherein the guide inclined wall is located on a side of the lock catch protrusion opposite to the barrier wall, and is configured to guide the energy storage arm to abut against the barrier wall.

13. The remote circuit breaker according to claim 8, wherein the opening switch further comprises: a first elastic component, wherein one end of the first elastic component is connected to the lock catch assembly, an other end is connected to the base, and the first elastic component is configured to provide a tendency for the lock catch assembly to rotate toward the energy storage arm.

14. The remote circuit breaker according to claim 8, wherein the energy storage assembly comprises a rotating member that is rotatably connected to the base and a second elastic component that is connected to the rotating member; and wherein the energy storage arm is located at one end of the second elastic component; and the rotating member is driven to rotate to enable the energy storage arm to abut against the barrier wall, so that the second elastic component is compressed, and the energy storage assembly is in the energy storage state.

15. The remote circuit breaker according to claim 14, wherein the rotating member comprises a rotating shaft that is rotatably connected to the base, and a turntable that is disposed on the rotating shaft; the second elastic component is a torsion spring, one end of the torsion spring abuts against the base, and an other end of the torsion spring abuts against the turntable; and the other end of the torsion spring is the energy storage arm of the energy storage assembly.

* * * * *